US012483951B2

(12) United States Patent
Wei et al.

(10) Patent No.: US 12,483,951 B2
(45) Date of Patent: Nov. 25, 2025

(54) WIRELESS COMMUNICATION APPARATUS AND METHOD FOR HANDOVER PREDICTION

(71) Applicant: MOXA INC., New Taipei (TW)

(72) Inventors: Hung-Yu Wei, New Taipei (TW); Sheng-Ru Zeng, New Taipei (TW)

(73) Assignee: MOXA INC., New Taipei (TW)

( * ) Notice: Subject to any disclaimer, the term of this patent is extended or adjusted under 35 U.S.C. 154(b) by 27 days.

(21) Appl. No.: 18/509,365

(22) Filed: Nov. 15, 2023

(65) Prior Publication Data

US 2025/0159568 A1    May 15, 2025

(51) Int. Cl.
*H04W 36/00* (2009.01)
*H04W 36/30* (2009.01)

(52) U.S. Cl.
CPC . *H04W 36/00837* (2018.08); *H04W 36/0061* (2013.01); *H04W 36/30* (2013.01)

(58) Field of Classification Search
CPC ....... H04W 36/00837; H04W 36/0061; H04W 36/30; H04W 36/00; H04W 36/00838;
(Continued)

(56) References Cited

U.S. PATENT DOCUMENTS 5,319,795 A * 6/1994 Hamabe ................ H04W 36/18
455/451
6,577,868 B1 * 6/2003 Vialen ................ H04Q 11/0478
455/442

(Continued)

FOREIGN PATENT DOCUMENTS

| CN | 111866978 A | 10/2020 | |
|---|---|---|---|
| EP | 3836621 A1 * | 6/2021 | ........ H04W 36/0061 |
| WO | WO-2022177647 A1 * | 8/2022 | .......... H04W 36/023 |

OTHER PUBLICATIONS

R. El Banna, H. M. El Attar and M. Aboul-Dahab, "Handover Scheme for 5G Communications on High Speed Trains," 2020 Fifth International Conference on Fog and Mobile Edge Computing (FMEC), Paris, France, 2020, pp. 143-149, doi: 10.1109/FMEC49853.2020.9144880. (Year: 2020).*

(Continued)

*Primary Examiner* — Kashif Siddiqui
(74) *Attorney, Agent, or Firm* — WPAT, P.C.; Anthony King

(57) ABSTRACT

A wireless communication apparatus is provided. The wireless communication apparatus includes a transceiver set and a processor electrically connected to the transceiver set. The transceiver set is configured to simultaneously communicate with a first base station through a first channel according to a first band setting and a second base station through a second channel according to a second band setting that is different from the first band setting. The processor is configured to: generate a first prediction time of reaching a first handover event corresponding to the first base station using a handover prediction model; generate a second prediction time of reaching a second handover event corresponding to the second base station using the handover prediction model; and determine whether to change one of the first band setting and the second band setting according to the first prediction time, the second prediction time and a threshold value.

20 Claims, 7 Drawing Sheets

(58) Field of Classification Search
CPC .. H04W 36/302; H04W 36/304; H04W 88/06
See application file for complete search history.

(56) References Cited

U.S. PATENT DOCUMENTS

| | | | |
|---|---|---|---|
| 7,158,759 B2* | 1/2007 | Hansen | H04W 36/302 |
| | | | 455/452.2 |
| 11,595,864 B1* | 2/2023 | Marupaduga | H04W 36/00698 |
| 2003/0040319 A1* | 2/2003 | Hansen | H04W 16/10 |
| | | | 455/450 |
| 2008/0108366 A1* | 5/2008 | Hu | H04W 72/20 |
| | | | 455/452.1 |
| 2021/0168674 A1* | 6/2021 | He | H04W 36/0064 |
| 2021/0185580 A1* | 6/2021 | Catalli | H04W 72/0453 |
| 2021/0235352 A1* | 7/2021 | Ohta | H04L 5/00 |
| 2021/0329522 A1 | 10/2021 | Li | |
| 2022/0303855 A1* | 9/2022 | Raymond | H04W 8/24 |
| 2022/0345955 A1* | 10/2022 | Lin | H04W 36/144 |
| 2023/0239783 A1* | 7/2023 | Mahler | H04W 24/02 |
| | | | 370/329 |
| 2023/0345317 A1 | 10/2023 | Sarkar et al. | |
| 2024/0080722 A1* | 3/2024 | Teyeb | H04W 36/0066 |
| 2024/0236803 A1* | 7/2024 | Medjkouh | H04W 36/324 |
| 2024/0292288 A1* | 8/2024 | Kollár | H04W 36/00837 |

OTHER PUBLICATIONS

Nyandika, Kimwele and Okeyo, "Handover Enhancement in Wireless Communication-Based Train Control Systems," 2021 International Conference on Electrical, Communication, and Computer Engineering (ICECCE), Kuala Lumpur, Malaysia, 2021, pp. 1-6, doi: 10.1109/ICECCE52056.2021.9514118. (Year: 2021).*

"Radio Communication for Communications-Based Train Control (CBTC): a Tutorial and Survey", IEEE Communications Surveys & Tutorials.

European search report issued by European Patent Office on Jun. 12, 2024.

English machine translation of CN111866978A.

* cited by examiner

| HO Type | Description | Cause | Event Class |
|---|---|---|---|
| LTE HO | (eNB1) → (eNB2) | E-UTRAN event A3 | LTE HO |
| MN HO | (eNB1, gNB) → (eNB2, gNB) | E-UTRAN event A3 | LTE HO |
| MN HO to eNB | (eNB1, gNB) → (eNB2) | E-UTRAN event A3 | LTE HO |
| SN HO | (eNB, gNB1) → (eNB, gNB2) | NR event A3 | NR HO |
| SN Release | (eNB, gNB1) → (eNB) | NR event A3 or SCG failure | NR HO |
| SN Setup | (eNB) → (eNB, gNB) | E-UTRAN event B1; Normally after MN HO to eNB, SN release, or RLF | SN Setup |
| RLF | Radio Link Failure | HO failure, reconfigure failure, out of sync | RLF |
| SCG Failure | Secondary Cell Group Failure | Random access problem, RLC maximum number of retransmission | -- |

FIG. 2

| Trigger Conditions for Re-configuration |
|---|
| T_1_start > T_change |
| T_2_start > T_change |
| T_1_end > T_2_start |
| (T_1_end - T_2_start) > threshold_1 |
| (T_2_start - T_1_start) > threshold_2 |
| Loss_1 > threshold_3 |
| Loss_1 > Loss_2 |
| Delay_1 > Delay_2 |

FIG. 7

WIRELESS COMMUNICATION APPARATUS AND METHOD FOR HANDOVER PREDICTION

TECHNICAL FIELD

The present application relates to wireless communication apparatus and methods; in particular, to the wireless communication apparatus and methods for handover prediction.

BACKGROUND

Wireless transmission technology gradually evolves from 4G Long-Term Evolution (LTE) to 5G New Radio (NR). In 5G NR network, a key application scenario is ultra-reliable low-latency communication (URLLC) for ultra-low latency and high-reliability communication.

For example, communications-based train control (CBTC) is a high-speed mobile application in a signaling system that uses wireless communications between onboard and ground track equipment (or trackside equipment) for train operation and control, to achieve convenient and accurate traffic management. In the application of CBTC, high-speed trains need low-latency and highly reliable communication with ground track equipment to prevent accidents. However, wireless transmission on high-speed mobile trains is affected by multiple handover (HO) and radio link failure (RLF) events, resulting in decreased transmission quality. Therefore, latency and packet loss are increased in data transmission.

Therefore, wireless communication apparatus and method with low latency and high reliability in CBTC are desired.

SUMMARY OF THE INVENTION

The present application discloses a wireless communication apparatus. The wireless communication apparatus includes a transceiver set and a processor electrically connected to the transceiver set. The transceiver set is configured to simultaneously communicate with a first base station through a first channel according to a first band setting and a second base station through a second channel according to a second band setting that is different from the first band setting. The processor is configured to: generate a first prediction time of reaching a first handover event corresponding to the first base station using a handover prediction model; generate a second prediction time of reaching a second handover event corresponding to the second base station using the handover prediction model; and determine whether to change one of the first band setting and the second band setting according to the first prediction time, the second prediction time and a first threshold value.

Furthermore, the present application discloses a wireless communication method. The wireless communication method includes: simultaneously communicating with a first base station through a first channel according to a first band setting and a second base station through a second channel according to a second band setting; generating a first prediction time of reaching a first handover event corresponding to the first base station using a handover prediction model; generating a second prediction time of reaching a second handover event corresponding to the second base station using the handover prediction model; and determining whether to change one of the first band setting and the second band setting according to the first prediction time, the second prediction time and a first threshold value.

BRIEF DESCRIPTION OF THE DRAWINGS

Aspects of the present disclosure are best understood from the following detailed description when read with the accompanying drawings. It is noted that, in accordance with the common practice in the industry, various features are not drawn to scale. In fact, the dimensions of various features may be arbitrarily increased or reduced for clarity of discussion.

FIG. 2 shows a table illustrating the relationship between the handover types and the event classes according to one embodiment of the present disclosure.

FIG. 7 shows a table illustrating the triggering conditions for re-configuration according to one embodiment of the present disclosure.

DETAILED DESCRIPTION

Some variations of the embodiments are described. Throughout the various views and illustrative embodiments, like reference numbers are used to designate like elements. It should be understood that additional operations can be provided before, during, and/or after a disclosed method, and some of the operations described can be replaced or eliminated for other embodiments of the method.

The disclosure provides a wireless communication apparatus and a wireless communication method for handover (HO) prediction to avoid high latency and packet loss in network of high-speed environment (e.g., communications-based train control (CBTC)). The apparatus and method use techniques including a technique of band locking and a technique of machine learning (ML).

The technique of band locking involves applying a setting by the wireless communication apparatus or by the user so that each wireless interface of the wireless communication apparatus is configured to only connect to a subset of predetermined frequency bands and are forbidden to be connected to the rest of available frequency bands provided by a base station. By performing the technique of band locking, the number of candidate channels of the base station to be considered could be reduced so as to avoid executing unnecessary HO procedures.

The technique of ML is capable of automatically learning from data and past experiences to identify features and make predictions, which focuses on the use of data and algorithms to imitate the way that humans learn, gradually improving its accuracy. For example, through the use of statistical methods, algorithms are trained to make classifications or predictions, and to uncover key insights in data mining projects.

The techniques could be especially helpful when the user is situated within a fast-moving train, and wireless communication apparatus has to undergo HOs very frequently.

Thus, by performing the techniques, abnormal performances is minimized by avoiding the overlaps of HO periods among different wireless interfaces.

Figure 1:
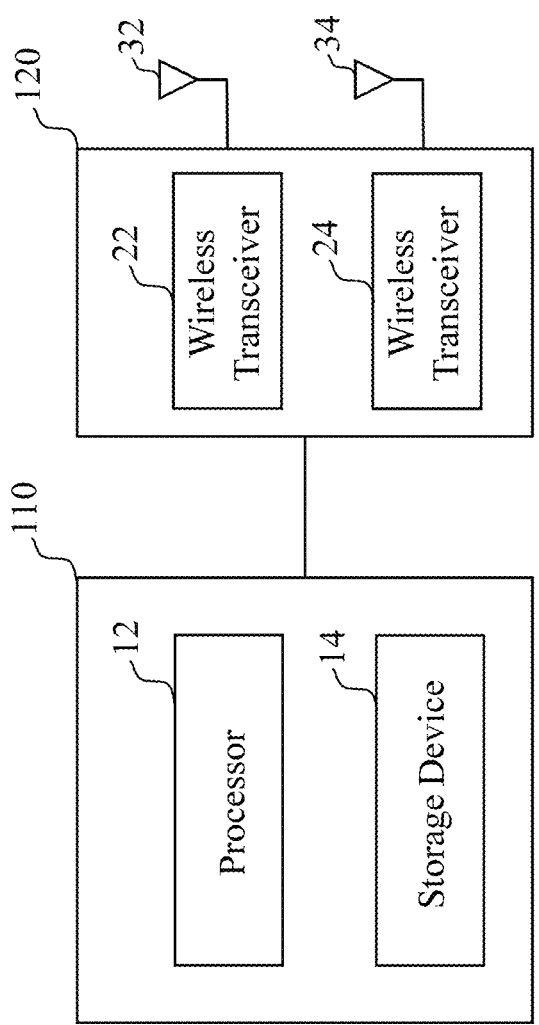
FIG. 1 is a wireless communication apparatus according to one embodiment of the present disclosure.

FIG. 1 is a wireless communication apparatus 100 according to one embodiment of the present disclosure. The wireless communication apparatus 100 includes a control node 110, a transceiver set 120 and two antenna modules 32 and 34. In the embodiment of FIG. 1, the transceiver set 120 includes the wireless transceivers 22 and 24, and the wireless transceivers 22 and 24 are coupled to the antenna modules 32 and 34, respectively. In some embodiments, the transceiver set 120 includes one or more wireless transceivers and one or more antenna modules. The number of wireless transceivers and the number of antenna modules are merely an example and are not intended to be limiting the disclosure.

Each of the antenna modules 32 and 34 includes a single antenna or an antenna array. The antenna modules 32 and 34 may have the same or different antenna configurations. In some embodiments, the antenna modules 32 and 34 may include the single antennas having omni-directional radiation patterns, and the single antennas are capable of communicating with different base stations. In some embodiments, the antenna module 32 or 34 may include an antenna array, and the antennas of the antenna array are capable of communicating with at least two base stations.

Each of the wireless transceivers 22 and 24 includes one or multiple integrated transmitters (not shown) and receivers (not shown), or one or more sets of separate transmitter and separate receiver. In general, the receiver is capable of down-converting a received radio frequency (RF) signal or a microwave signal into a baseband frequency, and the transmitter is capable of up-converting a received baseband signal into an RF signal or a microwave frequency. Furthermore, each of the wireless transceivers 22 and 24 is coupled to the control node 110 through a fiber, wireless or wired connection.

The wireless transceiver 22 and the antenna module 32 may form a first RF interface, and the wireless transceiver 24 and the antenna module 34 may form a second RF interface. In some embodiments, the first and second RF interfaces are arranged at the same locations. In some embodiments, the first and second RF interfaces are arranged at different locations. For example, the wireless communication apparatus 100 is set on a train, and the first RF interface is disposed at a front of a train carriage and the second RF interface is disposed at a middle of the train carriage or other train carriage.

The control node 110 includes a processor 12 and a storage device 14. The processor 12 is electrically connected to the transceiver set 120, and is configured to control the transceiver set 120 to establish communication links with two base stations according to different band settings. The processor 12 may be a central processing unit (CPU), a microprocessor, a microcontroller, a field programmable gate array (FPGA) unit, a graphics programming unit (GPU), a custom-made integrated circuit (IC) and so on.

In some embodiments, the processor 12 is configured to control the transceiver set 120 to communicate with the two base stations with the same generation or different generations of communication technologies. For example, the base stations may be evolved Node-Bs (eNBs) of 3GPP Long-Term Evolution (LTE) networks or gNodeBs (gNBs) of 5G New Radio (NR). The base station may also be referred to as an access point, an access terminal, a base unit or by other terminology used in the art. It should be noted that while the inventive concept is described in terms of 4G and 5G communication protocols or base stations, the disclosure is not limited to 4G and 5G communication systems and may extend beyond.

In some embodiments, each of the wireless transceivers 22 and 24 may support a 3GPP cellular wireless communication standard, such as 4G, 5G, 6G and so on. The wireless transceivers 22 and 24 may support the same or different radio access technologies. Moreover, the processor 12 is configured to control the wireless transceivers 22 and 24 to use different sets of radio frequencies. For example, the wireless transceiver 22 is controlled to use a first set of frequencies including the frequencies f1 and f2, and the wireless transceiver 24 is controlled to use a second set of frequencies including the frequencies f3 and f4. Alternatively, the wireless transceiver 22 is controlled to use a set of frequencies including the frequencies f1, f2, f3 and f4, and the wireless transceiver 24 is controlled to use the frequency f1.

In some embodiments, the processor 12 is configured to control the wireless transceivers 22 and 24 to use LTE/5G dual mode, e.g., non-stand-alone 5G or stand-alone dual mode LTE/5G. For example, the wireless transceiver 22 is controlled to use only LTE, and the wireless transceiver 24 is controlled to use only stand-alone 5G. Alternatively, the wireless transceiver 22 is controlled to use only LTE, and the wireless transceiver 24 is controlled to use both LTE and 5G capabilities.

The processor 12 is configured to control the operations of the transceiver set 120 according to the program instructions and data stored in the storage device 14. In some embodiments, the storage device 14 is a memory. The storage device 14 is further configured to store dataset for an HO prediction model and band configuration and determining conditions for a policy control model. The HO prediction model and the policy control model are performed by the processor 12 or implemented in the processor 12. The dataset includes data about HO/Radio Link Failure (RLF) and signal strength. In some embodiments, the data is collected on a vehicle in advance by user equipment (UE), e.g., a mobile device, and the vehicle travels on a fixed or known route. For example, the vehicle is a train or a metro that moves along an orbital path. The collected data may include packet information and signaling messages between the UE and the base stations collected along the orbital path when the UE transmits packets with consistent throughput to the base stations. By analyzing the collected data, the HO types are identified and categorized.

FIG. 2 shows a table illustrating the relationship between the HO types and the event classes according to one embodiment of the present disclosure. In the table of FIG. 2, the HO types are identified and categorized based on events described in 3GPP specification. For example, as shown in the second to fourth rows of the table, LTE HO, Master Node (MN) HO and MN HO to eNB of HO type are caused by E-UTRAN event A3 (Neighbor becomes offset better than special Cell (SpCell)) and are classified as the LTE HO event. As shown in the fifth and sixth rows of the table, Secondary Node (SN) HO and SN Release of HO type are caused by NR event A3 and are classified as the NR HO event. As shown in the seventh to ninth rows of the table, SN Setup, RLF and SCG Failure of HO type may be the critical events that are not caused by event A3 and are not classified as the LTE or NR HO event.

Event A3 is triggered when a neighbor cell becomes better than a SpCell by an offset. A special cell is the primary serving cell of either the Master Cell Group (MCG) or Secondary Cell Group (SCG). Event A3 is typically used for intra-frequency or inter-frequency HO procedures. Event A3 provides a HO triggering mechanism based upon relative measurement results, e.g. it can be configured to trigger when the signal quality measurement of a neighbor cell is stronger than the signal quality measurement of special cell. The signal quality measurements may include Reference Signal Received Power (RSRP), Reference Signal Received Quality (RSRQ) or Signal to Interference Noise Ratio (SINR).

The collected data includes the information regarding signal strength (e.g., the signal quality measurements) during specific time intervals and occurrences of certain types of HO events or critical events. According to the collected data, the processor 12 is configured to use the HO prediction model to perform ML tasks for prediction of HO events, so as to determine whether to change band configurations of the transceiver set 120 to prevent multiple HO events, thereby decreasing latency and packet loss caused by multiple HO events.

The HO prediction model of the disclosure may be trained first according to a plurality of training data sets. In some embodiments, each training data set includes an input training data (e.g., RSRPs during a time interval) and an output training data (e.g., an actual HO timing), and the training data sets are collected by the UE. The training data sets are utilized to train the HO prediction model by using a two-stage prediction approach for predicting HO events. In a first-stage prediction, the training data sets are used to train the HO prediction model to predict whether the HO event will occur. In a second-stage prediction, the training data sets are used to train the HO prediction model to predict the time of HO event occurrence. In some embodiments, a classifier is used in the first-stage prediction determining if a HO event is imminent, and a regressor is used for the second-stage prediction estimating the remaining time until the HO event occurs.

In some embodiments, after training the HO prediction model by the processor 12, the HO prediction model is stored in the storage device 14 for later use. In some embodiments, the HO prediction model is established based on the known ML models, such as support vector machine (SVM) model, recurrent neural network (RNN) model, eXtreme gradient boosting (XGB) model, gradient boosting (GB) model or other algorithm that shall be appreciated by those skilled in the art based on the above disclosure, and thus will not be further described herein.

In some embodiments, a time series forecasting task is used to predict the HO events. In the time series forecasting task, the collected data is structured as input features sequence in time intervals TP (e.g., 1 second), and a sliding time window approach is used to generate a sequence of training data points in prediction range.

Figure 3:
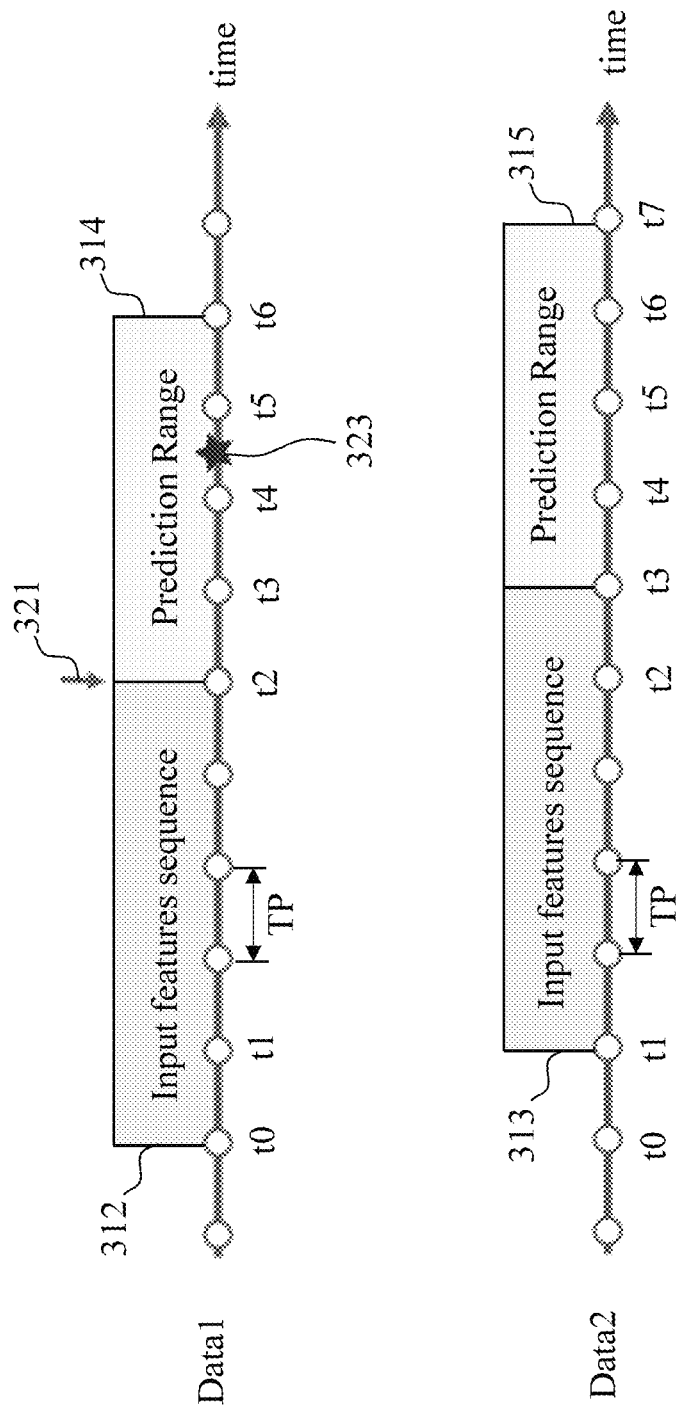
FIG. 3 shows a diagram illustrating the input features sequence and the prediction range corresponding to the collected data according to one embodiment of the present disclosure.

FIG. 3 shows a diagram illustrating the input features sequence and the prediction range corresponding to the collected data Data1 and Data2 according to one embodiment of the present disclosure. In FIG. 3, the collected data Data1 represents the data scene from time t0 to time t6, and the collected data Data2 represents the data scene from time t1 to time t7. Time t1 occurs immediately after time t0. In some embodiments, the time difference between time t1 and time t0 is one second.

The collected data is fed into the HO prediction model (or other pre-trained models) as input features for prediction. In response to the input features sequence, the prediction range is generated for each collected data, so as to predict whether a HO or RLF event will occur with classification algorithms in the HO prediction model and to predict how much time remained until the HO or RLF event with regression algorithms in the HO prediction model. For example, the prediction range 314 between time t2 and time t6 is generated according to the input features sequence 312 obtained from time to through time t2 for the collected data Data1, and the prediction range 315 between time t3 and time t7 is generated according to the input features sequence 313 obtained from time t1 through time t3 for the collected data Data2. In the embodiment of FIG. 3, the prediction ranges 314 and 315 are determined by the input features sequence 312 and the input features sequence 313, respectively. Different features between the input features sequence 312 and the input features sequence 313 will lead to different predictions. For example, a HO event 323 is predicted to occur within the prediction range 314 and between time t4 and time t5 according to the input features sequence 312, as shown in the collected data Data1. However, no HO event is predicted to occur within the prediction range 315 according to the input features sequence 313, as shown in the collected data Data2.

Figure 4:
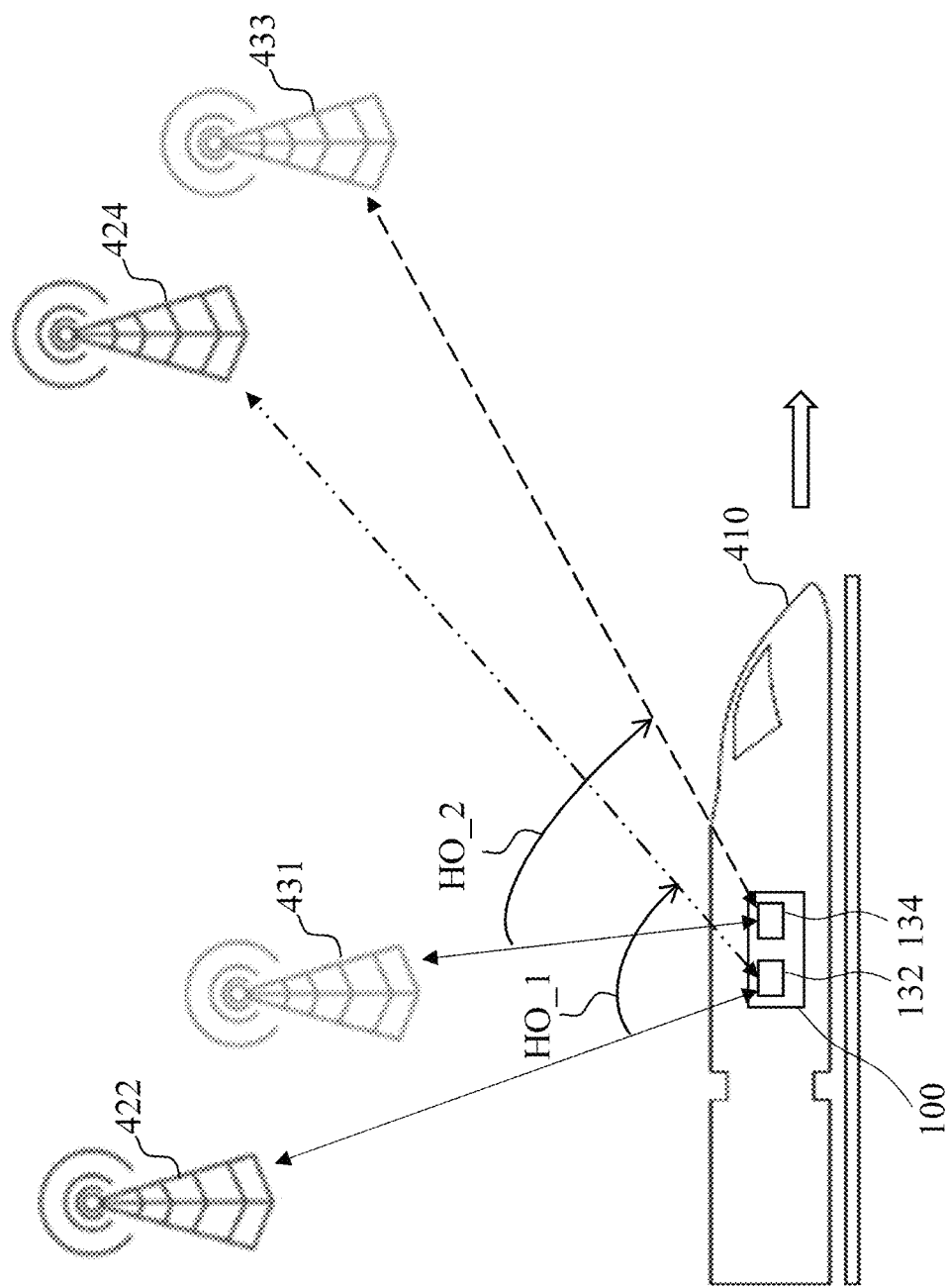
FIG. 4 shows a deployment scenario for the wireless communication apparatus of FIG. 1 according to one embodiment of the present disclosure.

FIG. 4 shows a deployment scenario for the wireless communication apparatus 100 of FIG. 1 according to one embodiment of the present disclosure. In the embodiment of FIG. 4, the wireless communication apparatus 100 is disposed in a fast-moving train 410. Furthermore, a first RF interface 132 including the wireless transceiver 22 and the antenna module 32 is configured to communicate with the base station 422 with a first band setting. A second RF interface 134 including the wireless transceiver 24 and the antenna module 34 is configured to communicate with the base station 431 with a second band setting. As described above, the first band setting is different from the second band setting. The first RF interfaces 132 and the second RF interface 134 may be disposed in the same or different locations in the train 410.

As the train 410 moves, HO procedures are performed between the base stations along a route of the train 410. For example, when the train 410 moves away from a coverage range of the base station 422 into a coverage range of the base station 424, a HO procedure is performed in response to a first HO event HO_1 for the first RF interface 132. Similarly, when the train 410 moves away from a coverage range of the base station 431 into a coverage range of the base station 433, a HO procedure is performed in response to a second HO event HO_2 for the second RF interface 134.

Figure 5:
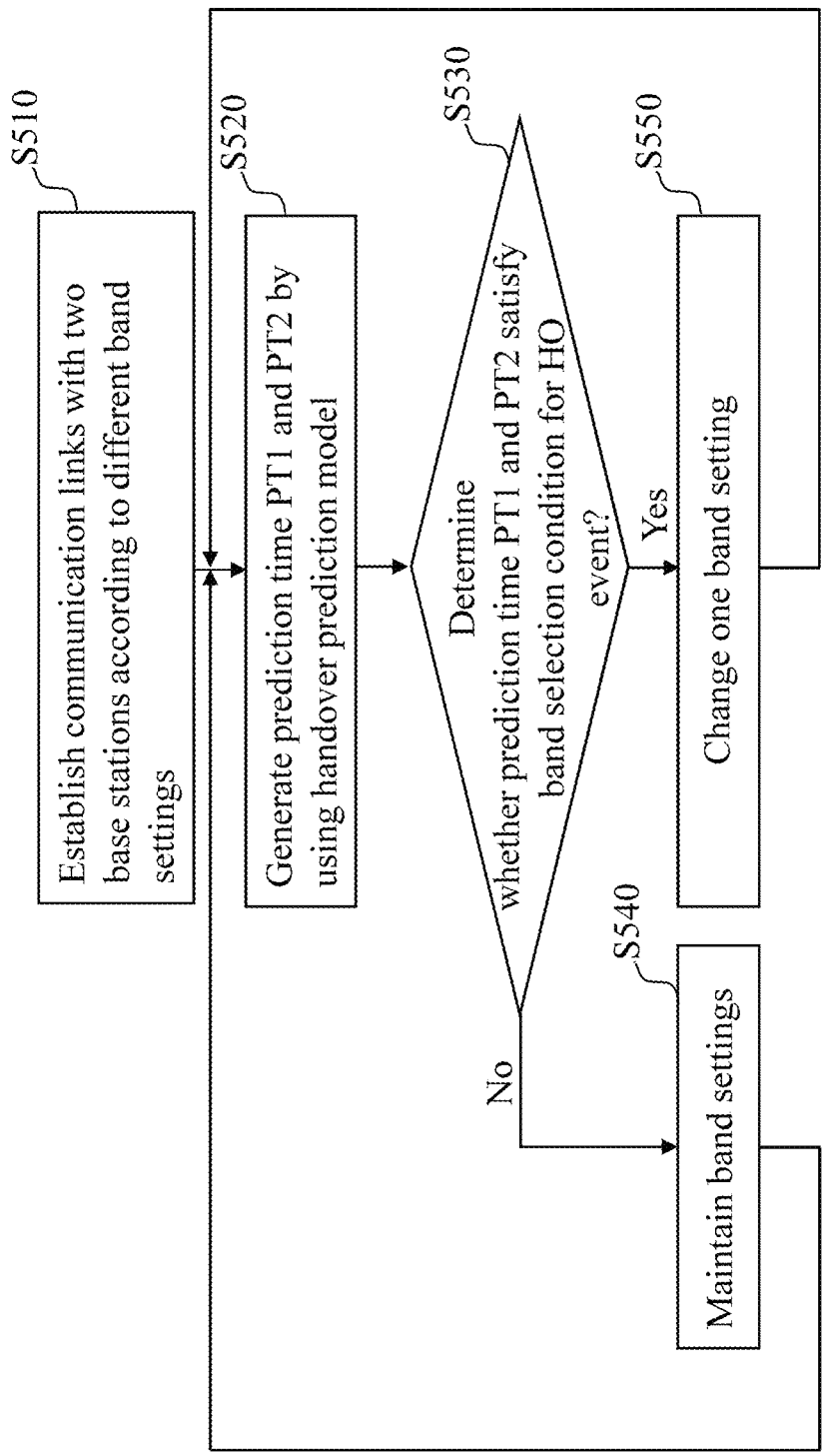
FIG. 5 is a wireless communication method performed by a wireless communication apparatus on a vehicle according to one embodiment of the present disclosure.

FIG. 5 is a wireless communication method performed by a wireless communication apparatus (e.g., 100 of FIG. 1) on a vehicle (e.g., 410 of FIG. 4) according to one embodiment of the present disclosure. The vehicle travels on the fixed or known routes. For convenience of explanation, the method of FIG. 5 will be explained in conjunction with FIG. 4.

The wireless communication method is implemented in a railway signaling system for CBTC that uses telecommunications between the train and ground track equipment for traffic management and infrastructure control. CBTC allows a train's position to be known more accurately than with traditional signaling systems. This makes railway traffic management safer and more efficient. Metros (and other railway systems) are able to reduce headways while maintaining or even improving safety.

In operation S510, the wireless communication apparatus 100 is configured to simultaneously establish communication links with at least two base stations according to different band settings. For example, in the wireless communication apparatus 100, the first RF interface 132 is configured to communicate with the base station 422 through a first channel CH1 according to a first band setting, and the second RF interface 134 is configured to communicate with the base station 431 through a second channel CH2 according to a second band setting. Through the communication links, the wireless communication apparatus 100 is configured to transmit the same packets to the base stations 422 and 431 for CBTC.

In operation S520, by using a HO prediction model, the processor 12 of the wireless communication apparatus 100 is configured to generate a first prediction time PT1 of reaching a first HO event HO_1 corresponding to the base station 422, and generate a second prediction time PT2 of reaching a second HO event HO_2 corresponding to the base station 431. The first HO event HO_1 corresponds a HO procedure between the base stations 422 and 424, and the second HO event HO_2 corresponds a HO procedure between the base stations 431 and 433. As described above, the HO prediction model may be a ML model with ML tasks for prediction of HO events. In response to the current signal quality measurement (e.g., RSRP, RSRQ or SINR), the HO prediction model is used to obtain the prediction time PT1 and PT2 according to the dataset stored in the storage device 14, and the data set includes the collected data previously collected by the UE. In some embodiments, the first prediction time PT1 and the second prediction time PT2 are generated according to a speed of the vehicle using the HO prediction model.

In operation S530, by using a policy control model, the processor 12 is configured to determine whether the prediction time PT1 and PT2 satisfy one band selection condition for prediction HO event. If the prediction time PT1 and PT2 do not satisfy any band selection condition, the first band setting of the first RF interface 132 and the second band setting of the second RF interface 134 are maintained (in operation S540). Thus, the first RF interface 132 is configured to continue communication with the base station 422 through the first channel CH1 according to the maintained first band setting, and the second RF interface 134 is configured to continue communication with the base station 431 through the second channel CH2 according to the maintained second band setting. Next, the flow returns to operation S520. The determination of band selection conditions will be described in FIG. 6.

If the prediction time PT1 and PT2 satisfy one of the band selection conditions in operation S530, one of the first band setting and the second band setting is changed in response to the satisfied band selection condition in operation S550, and then the flow returns to operation S520. For example, if the first band setting is changed and the second band setting is maintained for the upcoming first HO event HO_1, the first RF interface 132 is configured to communication with the base station 422 through a third channel CH3 in response to the changed first band setting, and the second RF interface 134 is configured to continue communication with the base station 431 through the second channel CH2 according to the maintained second band setting. Thus, the communication between the base station 422 and the first RF interface 132 is reconfigured to avoid the impact caused by the first HO event HO_1. In other words, the first switching event HO_1 will not come because the communication between the base station 422 and the wireless communication apparatus 100 has been re-configured to the third channel CH3. In some embodiments, the third channel CH3 is the candidate channel of the base station 422 in the technique of band locking, and the wireless communication apparatus 100 is configured to update the subset of frequency bands by reporting or non-reporting the channel measurements to the base station 422. Similarly, if the first band setting is maintained and the second band setting is changed for the upcoming second HO event HO_2, the first RF interface 132 is configured to continue communication with the base station 422 through the first channel CH1 according to the maintained first band setting, and the second RF interface 134 is configured to communication with the base station 431 through a fourth channel CH4 in response to the changed second band setting. Thus, the communication between the base station 431 and the second RF interface 134 is reconfigured to avoid the impact caused by the second HO event HO_2. In some embodiments, the fourth channel CH4 is the candidate channel of the base station 431 in the technique of band locking, and the wireless communication apparatus 100 is configured to update the subset of frequency bands by reporting or non-reporting the channel measurements to the base station 431. In operation S550, the changed band setting and the unchanged band setting are not on the same frequency band, thereby avoiding to use the same serving cell, which could result in HOs occurring around the same time. Furthermore, after one band setting is changed, the processor 12 is configured to control the HO prediction model to enter a rest period to avoid that the band changing procedure impacts transmission in CBTC. In some embodiments, the rest period is greater than the estimated time for the wireless communication apparatus 100 to complete re-configuration after changing one band setting.in operation S550.

Figure 6:
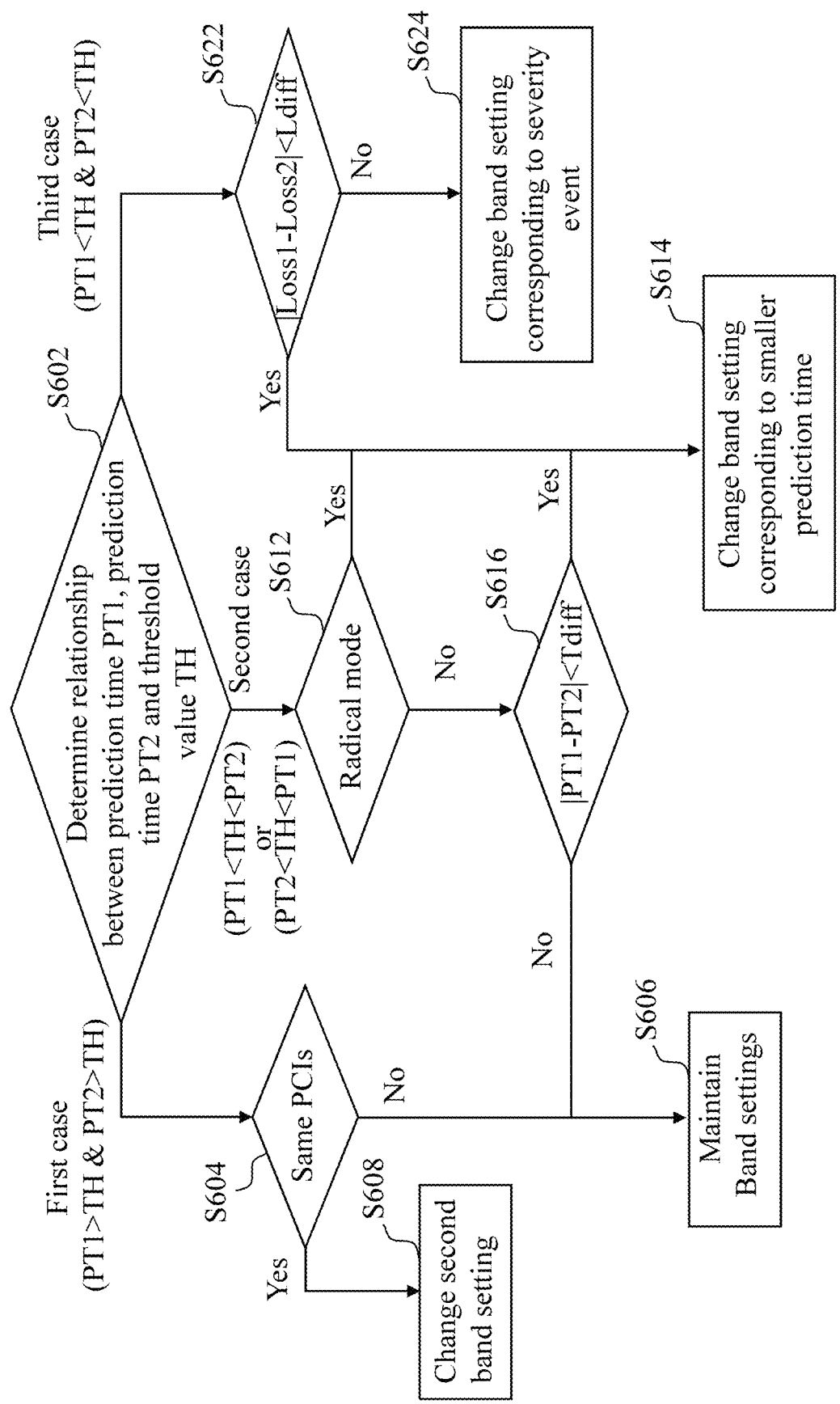
FIG. 6 is a flow chart illustrating how to determine whether to change one band setting according to one embodiment of the present disclosure.

FIG. 6 is a flow chart illustrating how to determine whether to change one band setting (i.e., the operations S530, S540 and 550 of FIG. 5) according to one embodiment of the present disclosure. For convenience of explanation, the flow chart of FIG. 6 will be explained in conjunction with FIG. 4. Furthermore, the policy control model is used to perform the operations of FIG. 6.

First, in operation S602, the processor 12 of wireless communication apparatus 100 is configured to determine relationship between the first prediction time PT1, the second prediction time PT2, and a threshold value TH. The threshold value TH is a predetermined time, e.g., 3 seconds. In some embodiments, the threshold value TH is determined according to a time interval and a HO type of the first HO event HO_1 and a time interval and a HO type of the second HO event HO_2. In some embodiments, the threshold value TH is determined according to the estimated time for the wireless communication apparatus 100 to complete re-configuration. In the embodiment of FIG. 6, the relationship between the first prediction time PT1, the second prediction time PT2 and the threshold value TH can be divided into a first case, a second case and a third case.

In the first case, both the first prediction time PT1 and the second prediction time PT2 are greater than the threshold value TH. In other words, the first RF interface 132 is far from the first HO event HO_1, and the second RF interface 134 is far from the second HO event HO_2, thus the first case is considered as a safe transmission condition relative to the second and third cases.

In operation S604 under the first case, the processor 12 is further configured to determine whether physical cell identifiers (PCIs) of the base stations 422 and 431 are the same. If the PCIs of the base stations 422 and 431 are different, the processor is configured to maintain the first band setting of the first RF interface 132 and the second band setting of the second RF interface 134 in operation S606, i.e., operation S540 in FIG. 5. If the PCIs of the base stations 422 and 431 are the same, the processor 12 is configured to change the second band setting of the second RF interface 134 in operation S608, so as to avoid packet loss caused by HO events of the base stations with the same PCIs, i.e., operation S550 in FIG. 5. Thus, the second RF interface 134 is configured to communication with the base station 431 through the fourth channel CH4 in response to the changed second band setting.

In some embodiment, in the operation S602, when it is determined that both the first prediction time PT1 and the second prediction time PT2 are greater than the threshold value TH, the operation S604 may be skipped and the operation S608 is performed by the processor 12 to change the second band setting of the second RF interface 134. In some embodiments, the operation S604 may be performed independently from the operation S602, and the processor 12 is configured to change the second band setting of the second RF interface 134 when it is determined that the PCIs of the base stations 422 and 431 are the same.

In the second case, the threshold value TH is between the first prediction time PT1 and the second prediction time PT2. If the first prediction time PT1 is greater than the second prediction time PT2 (i.e., PT2<TH<PT1), the first RF interface 132 is far from the first HO event HO_1, and the second RF interface 134 is close to the second HO event HO_2. Conversely, if the first prediction time PT1 is less than the second prediction time PT2 (i.e., PT1<TH<PT2), the first RF interface 132 is close to the first HO event HO_1, and the second RF interface 134 is far from the second HO event HO_2.

In operation S612 under the second case, the processor 12 is configured to determine whether the wireless communication apparatus 100 is operated in a radical mode. If the wireless communication apparatus 100 is operated in the radical mode, the processor 12 is configured to change the band setting corresponding to the smaller prediction time among the first and second band settings in operation S614, i.e., operation S550 in FIG. 5. For example, if the first prediction time PT1 is less than the second prediction time PT2, the processor 12 is configured to change the first band setting of the first RF interface 132, so that the first RF interface 132 can communication with the base station 422 through the third channel CH3 in response to the changed first band setting.

If it is determined that the wireless communication apparatus 100 is operated in a normal mode in operation S612, the processor 12 is configured to determine whether the first prediction time PT1 and the second prediction time PT2 are too close in operation S616 by comparing a time difference between the first prediction time PT1 and the second prediction time PT2 with a threshold value Tdiff. If the first prediction time PT1 and the second prediction time PT2 are too close (i.e., the time difference is less than the threshold value Tdiff), the flow enters operation S614. If the first prediction time PT1 and the second prediction time PT2 are not too close (i.e., the time difference is larger than or equal to the threshold value Tdiff), the flow enters operation S606.

In the third case, both the first prediction time PT1 and the second prediction time PT2 are less than the threshold value TH. In other words, the first RF interface 132 is close to the first HO event HO_1, and the second RF interface 134 is close to the second HO event HO_2, thus the third case is considered as an unsafe transmission condition relative to the first and second cases.

In operation S622 under the third case, the processor 12 is further configured to determine whether a loss difference between a first packet loss Loss1 of the base station 422 and a packet loss Loss2 of the base station 424 is less than a threshold value Ldiff or no severity event (e.g., RLF event) occur. If the loss difference is less than the threshold value Ldiff or no severity event occur, the flow enters operation S614. If the loss difference is greater than or equal to the threshold value Ldiff or the severity event occurs, the processor 12 is configured to change the band setting corresponding to the larger packet loss or the severity event among the first and second band settings in operation S624, i.e., operation S550 in FIG. 5. For example, if a RLF event occurs in the first RF interface 132, the processor 12 is configured to change the first band setting of the first RF interface 132, so that the first RF interface 132 is configured to communication with the base station 422 through the third channel CH3 in response to the changed first band setting.

In some embodiments, the processor 12 is configured to change the band setting corresponding to the HO event that is expected to occur earlier when one or more triggering conditions are present. For convenience of explanation, it is expected that the first HO event HO_1 will occur before the second HO event HO_2, and the triggering conditions are shown in a table of FIG. 7.

In FIG. 7, "T_1_start" is the estimated starting time of the first HO event HO_1, and "T_1_end" is the estimated ending time of the first HO event HO_1. Similarly, "T_2_start" is the estimated starting time of the second HO event HO_2. "T_change" is the estimated re-configuration time to change the first band setting. "threshold_1", "threshold_2" and "threshold 3" are threshold values determined the policy control model. In some embodiments, the threshold values "threshold_1" and "threshold_2" may equal to the estimated time "T_change". "Loss_1" is the expected packet loss of first HO event HO_1, and "Loss_2" is the expected packet loss of second HO event HO_2. "Delay_1" is the expected packet delay performance of the first HO event HO_1, and "Delay_2" is the expected packet delay performance of the second HO event HO_2. In some embodiments, when one of the triggering conditions is present, the processor 12 is configured to change the first band setting of the first RF interface 132.

According to the embodiments, the present disclosure is suitable for being used in a vehicle within which a wireless communication apparatus may undergo frequent HOs. The disclosure is able to achieve radio communication with base stations to decrease HO failures and its related problems of latency and data packet losses by decreasing the overlaps of HO events.

Although the preferred embodiments of the present disclosure have been described above, they are not used to limit the present disclosure, and a person having ordinary skill in the art will be able to make certain changes and modifications without departing from the spirit and scope of the disclosure, and thus, the protection scope of the present disclosure is defined by the annexed claims.

What is claimed is:

1. A wireless communication apparatus, comprising:
    a transceiver set configured to simultaneously communicate with a first base station through a first channel according to a first band setting and a second base station through a second channel according to a second band setting that is different from the first band setting; and
    a processor electrically connected to the transceiver set, and configured to:
        generate a first prediction time of reaching a first handover event corresponding to the first base station using a handover prediction model;
        generate a second prediction time of reaching a second handover event corresponding to the second base station using the handover prediction model; and determine whether to change only one of the following:
the first band setting from the first channel to a third channel, or the second band setting from the second channel to a fourth channel according to the first prediction time, the second prediction time and a first threshold value,
wherein in response to the first band setting being changed, the transceiver set is configured to communicate with the first base station through the third channel and with the second base station through the second channel, and in response to the second band setting being changed, the transceiver set is configured to communicate with the second base station through the fourth channel and with the first base station through the first channel.

2. The wireless communication apparatus of claim 1, wherein the processor is configured to change the first band setting when the first prediction time is less than the first threshold value and the second prediction time is greater than the first threshold value.

3. The wireless communication apparatus of claim 1, wherein the processor is configured to maintain the first band setting and the second band setting when the first prediction time and the second prediction time are greater than the first threshold value.

4. The wireless communication apparatus of claim 1, wherein the processor is configured to change the second band setting when one of the following conditions is met:
the first prediction time and the second prediction time are greater than the first threshold value,
physical cell identifiers (PCIs) of the first base station and the second base station are the same, or
the first prediction time and the second prediction time are greater than the first threshold value and the PCIs of the first base station and the second base station are the same.

5. The wireless communication apparatus of claim 1, wherein the processor is configured to change the first band setting when a difference between the first prediction time and the second prediction time is less than a second threshold value and the first threshold value is greater than the first prediction time and less than the second threshold value.

6. The wireless communication apparatus of claim 1, wherein the processor is configured to change the first band setting when a difference between a first packet loss of the first base station and a second packet loss of the second base station is less than a second threshold value and the second prediction time is less than the first threshold value and greater than the first prediction time.

7. The wireless communication apparatus of claim 1, wherein the processor is configured to:
determine whether a radio link failure (RLF) occurs in the first channel or the second channel; and
change the first band setting when the first prediction time and the second prediction time are less than the first threshold value and the RLF is detected in the first channel.

8. The wireless communication apparatus of claim 1, wherein the processor is configured to:
generate the first prediction time according to at least one first signal quality measurement corresponding to the first base station using the handover prediction model; and
generate the second prediction time according to at least one second signal quality measurement corresponding to the second base station using the handover prediction model.

9. The wireless communication apparatus of claim 1, wherein the wireless communication apparatus is disposed on a vehicle, and the processor is configured to generate the first prediction time and the second prediction time according to a speed of the vehicle using the handover prediction model.

10. A wireless communication apparatus, comprising:
a transceiver set configured to simultaneously communicate with a first base station through a first channel according to a first band setting and a second base station through a second channel according to a second band setting that is different from the first band setting; and
a processor electrically connected to the transceiver set, and configured to:
generate a first prediction time of reaching a first handover event corresponding to the first base station using a handover prediction model;
generate a second prediction time of reaching a second handover event corresponding to the second base station using the handover prediction model; and
determine whether to change the first band setting from the first channel to a third channel or the second band setting from the second channel to a fourth channel according to the first prediction time, the second prediction time and a first threshold value,
wherein in response to the first band setting being changed, the transceiver set is configured to communicate with the first base station through the third channel, and in response to the second band setting being changed, the transceiver set is configured to communicate with the second base station through the fourth channel,
wherein the processor is configured to:
generate a first time interval of the first handover event and a first handover type of the first handover event;
generate a second time interval of the second handover event and a second handover type of the second handover event; and
determine the first threshold value according to the first time interval, the first handover type, the second time interval and the second handover type.

11. The wireless communication apparatus of claim 1, wherein the transceiver set is configured to transmit the same packets to the first base station and the second base station.

12. The wireless communication apparatus of claim 1, wherein the transceiver set is configured to communicate with the first base station and the second base station via different generations of communication technologies.

13. A wireless communication method, comprising:
simultaneously communicating with a first base station through a first channel according to a first band setting and a second base station through a second channel according to a second band setting;
generating a first prediction time of reaching a first handover event corresponding to the first base station using a handover prediction model;
generating a second prediction time of reaching a second handover event corresponding to the second base station using the handover prediction model;
determining whether to change only one of the following: the first band setting from the first channel to a third channel, or the second band setting from the second channel to a fourth channel according to the first prediction time, the second prediction time and a first threshold value;

in response to the first band setting being changed, communicating with the first base station through the third channel and with the second base station through the second channel; and in response to the second band setting being changed, communicating with the second base station through the fourth channel and with the first base station through the first channel.

14. The wireless communication method of claim 13, wherein determine whether to change one of the first band setting and the second band setting according to the first prediction time, the second prediction time and the first threshold value further comprises:

maintaining the first band setting and the second band setting when the first prediction time and the second prediction time are greater than the first threshold value;

changing the second band setting when the first prediction time and the second prediction time are greater than the first threshold value and physical cell identifiers (PCIs) of the first base station and the second base station are the same;

changing the first band setting when the first prediction time is less than the first threshold value and the second prediction time is greater than the first threshold value;

changing the first band setting when a difference between the first prediction time and the second prediction time is less than a second threshold value and the first threshold value is greater than the first prediction time and less than the second threshold value; and changing the first band setting when a difference between a first packet loss of the first base station and a second packet loss of the second base station is less than a third threshold value and the second prediction time is less than the first threshold value and greater than the first prediction time.

15. The wireless communication method of claim 13, further comprising:

determining whether a radio link failure (RLF) occurs in the first channel or the second channel; and changing the first band setting when the first prediction time and the second prediction time are less than the first threshold value and the RLF is detected in the first channel.

16. The wireless communication method of claim 13, wherein the first prediction time is generated according to at least one first signal quality measurement corresponding to the first base station using the handover prediction model, and the second prediction time is generated according to at least one second signal quality measurement corresponding to the second base station using the handover prediction model.

17. The wireless communication method of claim 13, further comprising:

generating a first time interval of the first handover event and a first handover type of the first handover event using the handover prediction model;

generating a second time interval of the second handover event and a second handover type of the second handover event using the handover prediction model; and determining the first threshold value according to the first time interval, the first handover type, the second time interval and the second handover type.

18. The wireless communication method of claim 13, further comprising:

transmitting the same packets to the first base station and the second base stations via different generations of communication technologies.

19. The wireless communication apparatus of claim 1, wherein the third channel is a candidate channel of the first base station in a technique of band locking, and the fourth channel is a candidate channel of the second base station in the technique of band locking.

20. The wireless communication method of claim 13, wherein the third channel is a candidate channel of the first base station in a technique of band locking, and the fourth channel is a candidate channel of the second base station in the technique of band locking.

* * * * *